United States Patent [19]
Lowe et al.

[11] Patent Number: 5,700,305
[45] Date of Patent: Dec. 23, 1997

[54] METHOD OF PRODUCING HEATABLE MIRRORS BY DEPOSITING COATINGS ON GLASS

[75] Inventors: Martin Lowe; Timothy Jenkinson, both of Greater Manchester, United Kingdom

[73] Assignee: Pilkington Glass Limited, United Kingdom

[21] Appl. No.: 681,914

[22] Filed: Jul. 30, 1996

Related U.S. Application Data

[62] Division of Ser. No. 370,410, Jan. 9, 1995, Pat. No. 5,576,885.

[30] Foreign Application Priority Data

Jan. 10, 1994 [GB] United Kingdom ............... 9400323

[51] Int. Cl.$^6$ ............. C03C 17/00; C03C 25/02; C03B 13/00; C03B 18/02
[52] U.S. Cl. ............. 65/60.1; 65/60.2; 65/60.5; 65/60.8; 65/90; 65/99.1; 65/99.2; 427/162; 427/164; 427/165; 427/167
[58] Field of Search ............. 65/60.1, 60.2, 65/60.5, 60.8, 90, 99.1, 99.2; 427/162, 164, 165, 167

[56] References Cited

U.S. PATENT DOCUMENTS

| 2,519,722 | 8/1950 | Turner . | |
|---|---|---|---|
| 4,017,661 | 4/1977 | Gillery . | |
| 4,019,887 | 4/1977 | Kirkbride et al. . | |
| 4,100,330 | 7/1978 | Donley | 428/429 |
| 4,188,444 | 2/1980 | Landau . | |
| 4,188,452 | 2/1980 | Groth | 428/336 |
| 4,312,570 | 1/1982 | Southwell . | |
| 4,352,006 | 9/1982 | Zega | 219/219 |
| 4,382,177 | 5/1983 | Heaney . | |
| 4,400,326 | 8/1983 | Daudt et al. . | |
| 4,419,386 | 12/1983 | Gordon . | |
| 4,459,470 | 7/1984 | Schlichta et al. . | |
| 4,634,242 | 1/1987 | Taguchi et al. . | |
| 4,652,610 | 3/1987 | Dowbenko et al. . | |

(List continued on next page.)

FOREIGN PATENT DOCUMENTS

| 0372405 | 6/1990 | European Pat. Off. . |
|---|---|---|
| 0372438 | 6/1990 | European Pat. Off. . |
| 0456488 | 11/1991 | European Pat. Off. . |

(List continued on next page.)

OTHER PUBLICATIONS

J. Stone and L.W. Stulz: Reflectance, Transmittance, and Loss Spectra of Multilayer SiSiO$_2$ Thin Film Mirrors and Antireflection Coatings for 1.5μm *Applied Optics*, Feb. 1, 1990, vol. 29, No. 4, pp. 583–588.

Martin et al: Optical Properties of Thin Amorphous Silicon and Amorphous Hydrogenated Silicon Films Produced By Ion Beam Techniques *Electronics And Optics*, Thin Solid Films, 100 (1983), pp. 141–147.

Cartwright et al Abstract: *Multilayer Films of High Reflecting Power*, Physical Review, col. 55, 1939, p. 1128.

Asahi Glass Co.: Chemical Abstracts, vol. 110, No. 6, Feb. 6, 1989, Columbus, Ohio; Abstract No. 42057, p. 187 (JP 63195149, Aug. 12, 1988).

Asaka Glass Sangyo –(Abstract) Derwent Publications Ltd., AN 88–039167 and JP 62297242, Dec. 24, 1987.

*Primary Examiner*—Donald E. Czaja
*Assistant Examiner*—Jacqueline A. Ruller
*Attorney, Agent, or Firm*—Howrey & Simon; Joel M. Freed

[57] ABSTRACT

A method of producing heatable mirrors comprising depositing onto a ribbon of hot glass during the production process a reflecting coating whereby the mirrors so formed have a visible light reflection of at least 70% and depositing an electroconductive heating layer onto the mirrors. There is also provided a heatable mirror comprising a glass substrate carrying a non-metallic reflecting coating whereby the mirror has a visible light reflection of at least 70% and an electroconductive heating layer deposited on the coated substrate.

12 Claims, 1 Drawing Sheet

U.S. PATENT DOCUMENTS

| | | | |
|---|---|---|---|
| 4,654,067 | 3/1987 | Ramus et al. | 65/60.5 |
| 4,661,381 | 4/1987 | Callies et al. | |
| 4,673,248 | 6/1987 | Taguchi et al. | |
| 4,692,180 | 9/1987 | Villain et al. | 65/32 |
| 4,718,932 | 1/1988 | Pharms | 65/42 |
| 4,826,525 | 5/1989 | Chesworth et al. | 65/60.2 |
| 4,847,157 | 7/1989 | Goodman et al. | |
| 4,913,972 | 4/1990 | Grunewalder et al. | |
| 4,919,778 | 4/1990 | Dietrich et al. | |
| 4,921,331 | 5/1990 | Nakajima | |
| 4,944,581 | 7/1990 | Ichikawa | |
| 5,007,710 | 4/1991 | Nakajima et al. | |
| 5,143,445 | 9/1992 | Bateman et al. | |
| 5,168,003 | 12/1992 | Proscia | |
| 5,179,471 | 1/1993 | Caskey et al. | |
| 5,216,551 | 6/1993 | Fujii | |
| 5,252,140 | 10/1993 | Kobayashi et al. | 136/258 |
| 5,300,174 | 4/1994 | Leach et al. | |
| 5,505,989 | 4/1996 | Jenkinson | |
| 5,576,885 | 11/1996 | Lowe et al. | 359/585 |

FOREIGN PATENT DOCUMENTS

| | | |
|---|---|---|
| 0482933 | 4/1992 | European Pat. Off. |
| 0522785 | 1/1993 | European Pat. Off. |
| 0562660 | 9/1993 | European Pat. Off. |
| 0583871 | 2/1994 | European Pat. Off. |
| 1913901 | 4/1970 | Germany . |
| 3928939 | 3/1990 | Germany . |
| 3941859 | 1/1991 | Germany . |
| 52-56949 | 10/1977 | Japan . |
| 63-7883 | 1/1988 | Japan . |
| 63-180902 | 7/1988 | Japan . |
| 1-092700 | 4/1989 | Japan . |
| 1-194980 | 8/1989 | Japan . |
| 2-64601 | 3/1990 | Japan . |
| 5-281404 | 10/1993 | Japan . |
| 977820 | 12/1964 | United Kingdom . |
| 1262163 | 2/1972 | United Kingdom . |
| 1507465 | 4/1978 | United Kingdom . |
| 1507996 | 4/1978 | United Kingdom . |
| 1564618 | 4/1980 | United Kingdom . |
| 2033374 | 5/1980 | United Kingdom . |
| 1573154 | 8/1980 | United Kingdom . |
| 2135697 | 9/1984 | United Kingdom . |
| 2209176 | 5/1989 | United Kingdom . |
| 2224366 | 5/1990 | United Kingdom . |
| 2225343 | 5/1990 | United Kingdom . |
| 2227029 | 7/1990 | United Kingdom . |
| 2229738 | 10/1990 | United Kingdom . |
| 2247691 | 3/1992 | United Kingdom . |
| 2248853 | 4/1992 | United Kingdom . |
| 87/01970 | 4/1987 | WIPO . |
| 88/01568 | 3/1988 | WIPO . |
| 91/10563 | 7/1991 | WIPO . |
| 91/14662 | 10/1991 | WIPO . |
| 91/16197 | 10/1991 | WIPO . |

METHOD OF PRODUCING HEATABLE MIRRORS BY DEPOSITING COATINGS ON GLASS

This application is a division of application Ser. No. 08/370,410 filed Jan. 9, 1995 which application is now U.S. Pat. No. 5,576,885.

BACKGROUND OF THE INVENTION

The invention relates to heated mirrors and their manufacture.

The light reflecting properties of mirrors are generally provided by a layer of highly reflecting metal, especially silver, aluminium or chromium, applied to a glass or plastics substrate; copper layers are sometimes used as an alternative, but are generally less acceptable because of the strong red tint of the reflected light.

Silver coatings are generally applied to preformed glass plates, in the cold, by wet chemical methods in which a solution of silver salt is applied to the glass surface and reacted with a reducing agent which reduces silver ions present to silver metal which deposits on the glass surface. The silver used is not very durable in use and in practice requires protection by other layers, and these methods are generally unsuitable for application to glass on the production line on which it is formed so that a separate "silvering" line is required to produce the silvered glass.

Aluminium coatings are difficult to apply by chemical methods because of the strongly reducing nature of aluminium metal, and aluminium mirrors are generally produced by deposition methods carried out at low pressure e.g. by sputtering. Such low pressure methods are essentially batch processes and, like the wet chemical methods used for deposition of silver mirrors, are generally unsuitable for on-line application on the production line on which the glass is made.

GB 2248853A discloses a method of coating glass with aluminium to form a mirror. A solution of an alane amine adduct of aluminium is formed and the liquid is deposited onto heated glass. The adduct decomposes to form an aluminium coating. Although it is stated that it is envisaged that the invention may be used in conjunction with float glass production, there is no exemplification of such a use. It is believed that substantial technical problems could be encountered in simply introducing the disclosed aluminium compounds into a float glass line.

Silicon layers have also been used to produce reflecting layers (which, like silver and aluminium layers, are substantially neutral in reflection colour) on architectural glazing for aesthetic and solar control purposes. GB 1507465, 1507996 and 1573154 relate to a continuous chemical vapour deposition method for producing float glass having such a silicon layer, and U.S. Pat. No. 4,661,381 describes a development of that method. However, such silicon layers do not provide the high reflections commonly required in mirrors. Thus REFLECTAFLOAT (trade mark) glass, commercially available from Pilkington Glass Limited of St. Helens, England, has a reflection of about 50%, and MIRROPANE EP (trade mark) commercially available from Libbey-Owens-Ford Co. has a reflection of about 60%.

None of the above technology is currently suitable for the application of highly reflecting coatings to glass during the glass production process to provide a coated glass substrate with a light reflection of over 70%, and preferably over 80%.

Mirrors are often used in situations, such as in domestic bathrooms or as side view automotive mirrors, where water vapour can condense out on the mirror surface thereby to steam or mist up the mirror or water or ice can be deposited on the mirror. It is known to provide silvered mirrors having disposed behind the mirror a heating assembly comprising a heating element, assembled in or on an insulating layer. An example of such a known arrangement is a heating wire assembled in or on a plastics film which is adhered onto the rearmost paint layers of the mirror, the heating element being connected to a source of electrical power. Such a heating assembly is relatively complicated and can be expensive to manufacture.

The present invention aims to provide an improved heated mirror and manufacturing method therefor.

On a completely different scale, it has been proposed in GB 1262163, to produce very highly reflecting (greater than 90%) "cold light" mirrors comprising silicon layers for use, for example in cinema projectors, for separating heat radiation from visible light. Such cold light mirrors are produced by vacuum deposition on thin bases, typically glass substrates 3 mm thick or less, and are used without any backing paint to minimise build up of heat in the glass. GB 1262163 refers, in discussing the prior art, to a known cold light mirror comprising a "purest silicon layer" covered by four to six alternate layers of silicon oxide and tantalum oxide or titanium oxide but concludes that, for a satisfactory product, substantially more layers would be required. It therefore proposes to achieve the very high reflection (greater than 90%) required in a different way using several silicon layers as the individual layers of high refractive index of a multilayer interference system.

Much more recently, it has been proposed by J. Stone and L. W. Stulz (Applied Optics, February 1990, Volume 29, No. 4) to use quarter wavelength stacks of silicon and silica layers for mirrors in the spectral region between 1.0 and 1.6 microns (i.e. within the infra red). However, the authors observe that silicon cannot be used at wavelengths below about 1 micron (and thus not in the visible region of the spectrum) due to its high absorption at such wavelengths. Stone and Stulz refer to the deposition of $Si/SiO_2$ by low pressure methods such as reactive sputtering and electron beam evaporation.

Although GB 1262163 and the Stone and Stulz paper are discussed herein, the technology, in particular the production process described therein, is not suitable for the production of on line glass mirrors which essentially requires processes suitable for use at atmospheric pressure. Accordingly, these references would not be considered by the person skilled in the art as being in any way relevant to the production of on-line mirrors to compete with the conventional "off-line" mirrors discussed above.

SUMMARY OF THE INVENTION

The present inventors have discovered in accordance with one aspect of the present invention that highly reflecting coatings can in practice be applied on line to glass during the production process, especially on a float glass production line, by depositing a reflecting layer and by depositing, before or after the deposition of the reflecting layer, two layers as reflection enhancing layers. A heating layer comprising electrically conductive oxide film can also be deposited on-line and so a heated mirror can be made during the production process. Alternatively, the heating layer can be applied off-line.

According to the present invention there is provided a method of producing heatable mirrors comprising depositing onto a ribbon of hot glass during the production process a non-metallic reflecting coating whereby the mirrors so formed have a visible light reflection of at least 70% and depositing an electroconductive heating layer onto the mirrors.

The coated ribbon is cut on-line and will usually be further cut off-line to provide separate mirrors of the required size.

The present invention further provides a heatable mirror comprising a glass substrate carrying a non-metallic reflecting coating whereby the mirror has a visible light reflection of at least 70% and an electroconductive heating layer deposited on the coated substrate.

In one preferred embodiment the heating layer is deposited over the reflecting coating onto the ribbon of hot glass during the production process. The reflecting coating may be deposited in a float bath of a float glass plant and the heating layer may be deposited in a gap between the float bath and an annealing lehr. The heating layer so deposited may comprise the rear surface of a back surface mirror.

In an alternative embodiment, the heating layer is deposited on a glass surface which is on the opposing side of the mirror to the reflecting coating. Such a heating layer may be deposited off-line onto mirrors which have been cut from the coated ribbon. Such a heating layer so deposited may comprise the rear face of a front surface mirror.

The reflecting coating may comprise a reflecting layer and at least two reflection enhancing layers. Preferably, the reflection enhancing layers comprise an intermediate layer of the coating of relatively low reflective index and a layer adjacent to the intermediate layer of relatively high refractive index.

In this specification the terms "reflecting layer" and "reflection enhancing layer" are intended to indicate the relative interrelationship between the layer positions. Thus, the reflecting layer is, in use, furthest from the source of light to be reflected and the reflection enhancing layers are between the light source and the reflecting layer. The term "reflecting layer" is not necessarily intended to imply that that layer is the primary contributor to the overall reflection of the reflecting coating as compared to the other layers of the coating. In certain embodiments the largest contributor to the overall reflection may be a reflection enhancing layer. Thus for front surface mirrors the inner of the said three layers is the reflecting layer and intermediate and outer layers act as reflection enhancing layers, and for back surface mirrors the outer of the said three layers is the reflecting layer and the intermediate and inner layers act as reflection enhancing layers. The inner layer is identified as the layer of the coating nearest to the glass and the outer layer as the layer furthest from the glass of the said three layers.

It is known in the art that refractive index varies with wavelength. In this specification and claims, references to "refractive index" are intended to mean (in conventional manner) the refractive index for light of wavelength 550 nm and, in assessing and quoting refractive index values, any imaginary part of the refractive index is disregarded.

The expression "visible light reflection", as used in the present specification and claims, refers to the percentage of light reflected under Illuminant D65 source 1931 Observer Conditions.

The reflecting layer may have a high refractive index and the reflection enhancing layers may have high and low refractive indices so that the resultant stack of layers has successive high, low and high refractive indices.

The desired high reflection may be achieved using layer thicknesses such that reflections from the interfaces between the said coating layers reinforce reflections from the outer surface of the said outer layer (for front surface mirrors) or the inner surface of the said inner layer (for back surface mirrors). The materials of the inner and outer layers are preferably selected so that the aggregate refractive index of the materials of the two layers is at least 5.5 when the reflecting layer is of high refractive index.

Silicon is preferably used for at least one of the inner and outer layers because (a) it may have a particularly high refractive index and (b) it is readily deposited on-line on hot glass, for example, by the processes described in GB 1507465, GB 1507996 and GB 1573154.

The refractive index of silicon may be as great as about 5, (see P. J. Martin, R. P. Netherfield, W. G. Sainty and D. R. McKenzie in Thin Solid Films 100 (1983) at pages 141–147) although lower values are often encountered.

It is believed that, in practice, the value varies depending on the precise physical form of the silicon and the presence of any impurities, for example oxygen, nitrogen or carbon. For the purpose of the present invention, the presence of such impurities may be tolerated (and indeed, it is difficult in practice to produce on-line silicon coatings without significant oxygen and/or carbon incorporation) provided the refractive index is not reduced below about 2.8. Thus the term "silicon" as used herein with reference to layers of relatively high refractive index refers to material which is predominantly silicon, but may contain minor proportions of impurities, provided its refractive index is at least 2.8.

While its high refractive index and ease of deposition favour the use of silicon, the high absorption of silicon leads to a reduction in the reflection. When only one of the inner and outer layers is of silicon, the other (preferably the inner layer for back surface mirrors and the outer layer for front surface mirrors) must be of a material having a higher refractive index than the intermediate layer (and of at least 1.6) and is preferably of low absorption in the visible region of the spectrum. Preferred materials, other than silicon, for a layer of relatively high refractive index are materials having a refractive index in the range 1.9 to 3.0, usually 2.0 to 2.7 and include tantalum oxide, titanium oxide, tin oxide and silicon oxides (including silicon oxides containing additional elements, for example nitrogen and carbon). The amount of such additional elements in silicon oxide can be varied so as to vary the refractive index because the refractive index is composition-dependent. The deposited silicon oxides are generally not stoichiometric. In general, the higher the refractive index of a material, and the lower its visible light absorption, the more effective it will be as a reflecting layer or reflection enhancing layer of high refractive index; expressed in another way, a reduction in the refractive index of the material may be compensated for by a reduction in its visible light absorption.

The intermediate layer i.e. the reflection enhancing layer adjacent the reflecting layer, which is of relatively low refractive index, has a refractive index lower (and in any event below 3) than that of the inner and outer layers of relatively high refractive index. In general, the lower the refractive index (for a layer of given light absorption) of the intermediate layer, the higher the reflection that can be achieved. The layer of relatively low refractive index will usually have a refractive index below about 2, and it is generally preferred to use a layer of refractive index less than 1.8.

It is also preferred to use as the intermediate layer a material which is substantially non-absorbing in the visible region of the spectrum in order to increase the total light reflection. A suitable and convenient layer material is silicon oxide, which may however contain additional elements such as carbon or nitrogen, and the term "silicon oxide" is used herein to encompass silicon oxides additionally containing other elements, for example, silicon oxides containing carbon and/or nitrogen and, when used with reference to the intermediate layer, having a refractive index of less than 2. Surprisingly, it is found in practice, that adjacent layers of silicon and silicon oxide can be applied pyrolytically to the glass without interdiffusion or interactions which would cause unacceptable reduction in the refractive index of the silicon or increase in the refractive index of the silicon oxide; the adjacent layers of silicon and silicon oxide appear to remain, at least in terms of their optical performance, separate and distinct. However, it may be that at the interfaces of the layers there exist physically narrow interaction zones with steep refractive index gradients that do not alter the optical characteristics of the mirror. Another material which may be used for the intermediate layer is aluminium oxide.

Some of the coating materials, especially silicon, which may be used to form the outer layer of high refractive index have limited scratch resistance and, if a more durable product is required, an additional protective layer of a harder material, for example of tin oxide, may be deposited over said outer layer. It will be appreciated that, if such a protective layer is used on front surface mirrors, it should be of a material (and tin oxide and titanium oxide are examples) that has a low light absorption in the visible region of the spectrum in order to maintain the light reflection of the product, and should be of an optical thickness subtantially different from a quarter wavelength to avoid suppressing the reflection from the outer layer; if used, such a protective layer will typically have a thickness in the region of 10 nm to 30 nm. An outermost layer, of silicon, titania or the above-described protective layer, provides chemical durability to the mirrors. This is a real technical advantage over the known silver mirrors.

The thicknesses of the layers may be selected, in generally known manner (see for example the prior art referred to above), so that the reflections from the interfaces between the intermediate layer of relatively low refractive index and the inner and outer layers reinforce reflections from either the outer surface of the said outer layer (for front surface mirrors) or the inner surface of said inner layer (for back surface mirrors). This will occur for front surface mirrors when the said intermediate and outer layers have an optical thickness of about n λ/4 and, for back surface mirrors, when said inner and intermediate layers each have an optical thickness of about n Aλ/4 wherein, in each case, λ is a wavelength of light in the visible region of the spectrum, i.e. from about 400 nm to 750 nm and n is an odd integer; n may be the same or different for each of the said layers, but is preferably 1 in each case.

It is preferable that, when either (or both) the inner layer or the outer layer is of relatively high refractive index material which is non-absorbing or only weakly absorbing in the visible region of the spectrum, both said inner and said outer layers have a thickness of about n λ/4, where n and λ are as defined above. In this way, reflections from, in the case of front surface mirrors, the interface between the inner layer of relatively high refractive index and the glass and, in the case of back surface mirrors, the face remote from the glass of the outer layer of relatively higher refractive index will reinforce the reflections from the interfaces between the coating layers increasing the overall visible light reflection of the mirrors. On the other hand when both said inner layer and said outer layer are of material which is highly absorbing in the visible region of the spectrum, the thickness of the layer remote from the light source (the reflecting layer) is less critical, since the amount of light passing back towards the light source after reflection at the side of that layer remote from the source will be much reduced by absorption.

To achieve the desired visible light reflection of 70% the thicknesses of the layers of optical thickness about n Aλ/4 may be selected so that the phase differences of the light of a wavelength of aboat 500 nm reflected towards the light source from the interfaces between the said coating layers and either (for front surface mirrors) the outer surface of the outer layer or (for back surface mirrors) the inner surface of the inner layer are all within ±40% of a wavelength and preferably within ±20% of a wavelength. The general condition is that all the primary reflected rays from the interfaces and either, for front surface mirrors said outer face or, for back surface mirrors said inner face, be substantially in phase with a phase error not exceeding those percentage values. Preferably, each of the reflection enhancing layers (being in the case of front surface mirrors each of the outer and intermediate layers and in the case of back surface mirrors the inner and intermediate layers) will have an optical thickness of 125 nm±25%; and, unless the reflecting layer is a metal, or neither inner nor outer layer is non-absorbing or only weakly absorbing in the visible, the reflecting layer will also have an optical thickness of 125 nm±25%.

The closer the optical thicknesses of the layers are to n.500 nm/4 the more neutral the reflection colour will be, while the closer the optical thicknesses of the layers are to n.550 nm/4 the higher will be the total light reflection. However, it will readily be appreciated, by those skilled in the art, that the reflection colour can be tuned by varying the optical thicknesses of the layers within the range from about one quarter of 400 nm (blue-green reflection) to one quarter of 750 nm (red-yellow reflection); it will also be appreciated that tuning away from about 550 nm will reduce the total visible light reflection of the product.

According to the preferred method of the invention, the layers of the required index are applied to a ribbon of hot glass during the glass production process. The depositions may be carried out in a known manner by liquid or powder spray processes, or by a chemical vapour deposition process, and each of the layers may be leposited by a different type of process. The depositions may be pyrolytic involving decomposition of a compound which is a pre-cursor for the material of the desired layer, possibly by reaction with another compound.

In general, it is convenient to use a chemical vapour deposition process to apply any silicon or silicon oxide (which may contain carbon) layers that may be required. Thus, for example, any silicon layer may be deposited (directly or indirectly) on the hot substrate by chemical vapour deposition from a silane gas, conveniently in a gaseous diluent, for example nitrogen. It is generally most convenient to use monosilane, although other silanes may also be used, such as dichlorosilane. One suitable process for deposition of such a silicon layer is described in GB 1507996. If desired, for example to improve the alkali resistance of the silicon coating, the reactant gas may contain a proportion of a gaseous electron donating compound, especially an ethylenically unsaturated hydrocarbon compound, for example, ethylene, as additive.

A layer of silicon oxide containing carbon for use as a reflecting layer or a reflection enhancing layer of high refractive index but low absorption in the visible may similarly be deposited by chemical vapour deposition from a silane gas, conveniently in a gaseous diluent, in admixture with an ethylenically unsaturated hydrocarbon compound, for example ethylene, using a somewhat higher proportion of ethylene to silane than is required to produce a silicon layer. Again, the silane used is conveniently monosilane.

A silicon oxide layer for use as a reflection enhancing layer of low refractive index (i.e. an intermediate layer) may similarly be deposited by chemical vapour deposition from a silane gas, conveniently in a gaseous diluent, in admixture with oxygen or a source of oxygen. A mixture of a silane and an ethylenically unsaturated hydrocarbon, together with carbon dioxide or an alternative oxygen compound which serves as a source of oxygen such as a ketone, for example acetone, may be used. The relative concentrations of silane and the source of oxygen used will depend on the refractive index required; in general, the lower the refractive index required, the larger the proportion of oxygen-containing compound to silane to be used. Again, the silane used is preferably a monosilane.

For metal oxide layers, such as tin oxide or titanium oxide, either a liquid or powder spray process or a chemical vapour deposition will generally be used. Thus, for example, a layer of tin oxide or titanium oxide may be deposited by chemical vapour deposition by reaction of the corresponding gaseous metal chloride and water vapour, or by spraying a non-aqueous solution of the metal chloride onto the hot glass in the presence of water vapour. Thus tin oxide may be deposited by chemical vapour deposition of components selected from tin tetrachloride and water vapour, and an organo tin compound such as diethyl tin dichloride or tetramethyl tin, and oxygen, the oxygen optionally being present in air. The titanium oxide may be deposited by chemical vapour deposition of a titanium alkoxide, such as titanium isopropoxide, optionally in the presence of water or air.

When applying a reflecting coating layer to a ribbon of float glass, the chemical vapour deposition techniques can conveniently be carried out inside the float bath i.e. where the glass is supported on a molten metal bath under a protective atmosphere (but preferably after the glass has finished stretching i.e. at a glass temperature below 750° C.), or after the ribbon has emerged from the float bath. When using a gas containing monosilane to deposit silicon, silicon oxide containing carbon, or other silicon oxide layers, it is preferred to carry out the deposition of that layer in the float bath where the glass is at a temperature in the range 600° C. to 750° C. in order to achieve a satisfactory rate of deposition.

When applying a coating layer to a ribbon of float glass by a liquid or powder spray process, it will generally be more convenient to deposit the layer after the ribbon of glass has emerged from the float bath.

The electroconductive heating layer which is applied to the mirror preferably comprises a heating layer of a conducting oxide, such as fluorine-doped tin oxide, indium tin oxide or other conducting oxide. When the heating layer is applied over the reflecting coating, which is deposited onto the ribbon of float glass in the float bath of the float glass plant, the heating layer is preferably applied in the lehr gap between the float bath and the annealing lehr. The heating layer may be applied using the methods and apparatus disclosed in our GB 2227029 and GB 2225343 the disclosures of which are incorporated herein by reference thereto. Alternatively, the heating layer may be applied off-line either in a separate coating furnace or by vacuum deposition after separate mirrors have been cut from the ribbon of glass. The heating layer may be deposited over the uncoated glass surface or the reflecting coating.

The reactants to form a layer of electroconductive fluorine-doped tin oxide comprise stannic chloride ($SnCl_4$) and a mixture of hydrogen fluoride and methanol together with steam. The stannic chloride reactant is introduced in a carrier gas as a turbulent flow over the ribbon of glass, and then the remaining reactants, comprising the HF/methanol mixture and steam, are introduced into that flow to form a composite turbulent flow along the direction of glass movement. The reactants react together forming fluorine-doped tin oxide on the reflecting coating or on the glass surface. The exhaust gases are extracted away from the ribbon of hot glass.

The preferred layers—including silicon, silicon oxide, titanium oxide and (undoped) tin oxide and the heating layer of fluorine-doped tin oxide used in the practice of the present invention may result in a coated glass product which may be annealed in a similar manner to that known for annealing of glass bearing a pyrolytic fluorine-doped tin oxide coating for use as a low emissivity coating with the potential problems of annealing a glass bearing a coating of silver (as traditionally used in mirrors) being avoided. This means that such heatable mirrors can readily be produced on-line in a float glass process.

After the mirrors carrying the heating layer have been produced as described above, busbars are deposited onto the individual mirrors, for example by a silk screen printing process, with the busbars preferably being composed of a silver metal-containing frit. The printed busbars are then pre-dried in an oven and are then fired in a furnace to consolidate the printed layer. Electrical connections are then made to the busbars using insulated wires and a solder, for example of indium. In use, the heatable mirrors made in accordance with the present invention can be mounted to a source of electrical power, for example from a battery or from the electric mains, and electric current passes through the electroconductive heating film thereby heating it, and thereby the front surface of the mirror by heat conduction through the glass substrate and producing a demisting surface on the front surface of the mirror. A typical sheet resistance of the electroconductive heating layer is around 14 ohms/square although the sheet resistance may be varied, in particular reduced, as required depending upon the particular application of the heated mirror. For a mirror having a square aspect, dimensions of 160×160 mm and with bus bars 137 mm apart, and carried on a 2 mm thick glass pane, a typical voltage which is applied to the electroconductive heating film is 6 to 12 volts at a current of 0.47 to 0.9 amps. This generates sufficient heating of the front surface of the mirror to produce a demisting surface at normal room temperatures. The voltage and current may be varied depending upon the heating requirements and the available electrical power.

The process of the present invention is useful for the production of heatable mirrors for a wide range of purposes, including domestic use as mirrors in bathrooms and bedrooms. For many uses the mirrors will be provided with an obscuring layer, preferably a substantially opaque layer, on the side which is to be remote from the source of light to be reflected in use. Thus, for back surface mirrors, the obscuring layer will usually be applied over the heating layer which extends over the reflecting coating while for front surface mirrors the obscuring layer will generally be applied over the heating layer which extends over the back surface of the glass.

The ability to produce heatable glass mirrors on-line at high yield, using coating steps based on known technology, for example the pyrolytic deposition of a silicon layer, is an important step forward.

The skilled man will also appreciate that additional low and high refractive index quarter wave (n λ/4 where n is an odd integer, preferably 1) layers may be added to the stack of layers to further enhance the reflection.

It may also be possible to incorporate additional non-quarter wave layers between the said inner and outer layers, although in that event such layers are generally best regarded as forming part of a composite intermediate layer which should, considered as a composite single layer, have a thickness such that the phase differences of the light reflected towards the light source from the interfaces of said composite intermediate layer and the other coating layers and either (for a front surface mirror) the outer surface of the outer layer or (for a back surface mirror) the inner surface of the inner layer are all within ±40% of a wavelength, and preferably within ±20% of a wavelength. Thus the composite single layer will have a refractive index less than the refractive index of either said inner layer or said outer layer and less than 3; preferably such composite single layer will have a refractive index of less than 1.8 and an optical thickness of 125 nm±25%. Similarly, an additional layer may be included between the inner layer and the glass although, in the case of a back surface mirror, it will then normally be of refractive index intermediate between the refractive index of the inner layer and the glass.

BRIEF DESCRIPTION OF THE DRAWINGS

The invention is illustrated but not limited by the following drawings and Example. In the drawings.

DETAILED DESCRIPTION OF THE PREFERRED EMBODIMENTS

Figure 1:
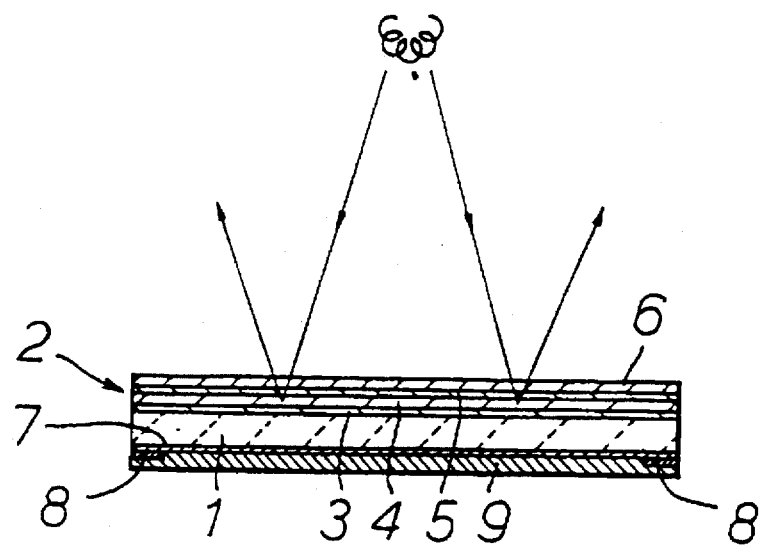
FIG. 1 is a section (not to scale) through a mirror in accordance with a first embodiment of the invention in use as a front surface mirror.

Referring to FIG. 1, a front surface glass mirror comprises a float glass substrate 1 carrying a coating 2 comprising an inner layer 3 of relatively high refractive index, for example of pyrolytic silicon, and intermediate layer 4 of relatively low refractive index, for example of silicon oxide having a refractive index below 1.8 and containing silicon and oxygen in atomic proportions of about 1:2, and an outer layer 5 of relatively high refractive index, for example of pyrolytic silicon. If only one of the layers 3 and 5 of relatively high refractive index is of silicon, it will usually be the inner layer, with a material having a lower absorption for visible light, for example silicon oxide containing carbon or titanium oxide, being used as the outer layer 5. Each of the intermediate layer 4 and the outer layer 5 has an optical thickness of nλ/4, wherein n is an odd integer (preferably 1) and λ is a wavelength of light in the visible region of the spectrum i.e. from about 400 nm to 750 nm. If the inner and outer layers 3 and 5 are of an absorbing material such as silicon, the thickness of the inner layer is less critical, but it may also correspond to an optical thickness of nλ/4 wherein n and λ are as defined above and n is an odd integer preferably 1.

A protective layer 6 more durable than outer layer 5 is applied over layer 5. The protective layer may be of tin oxide, and may be applied by chemical vapour deposition. When the outer layer 5 is of silicon, such a protective layer of tin oxide should be applied only after a surface layer of silicon oxide has been formed on the silicon, for example, as described in U.S. Pat. No. 4,661,381.

An electroconductive heating layer 7 is disposed on the back surface of the glass substrate 1, the heating layer preferably comprising a coating of fluorine-doped tin oxide. The thickness of the heating layer 7 is typically around 3200 angstroms. The heating layer 7 typically has a sheet resistance of around 14 ohms/square or lower although the sheet resistance may be varied as required depending upon the end application of the heatable mirror. Busbars 8 preferably composed of silver-containing frit are silk screen printed on opposed sides of the heating layer 7. Electrical connections (not shown) are made to the busbars 8, for example by using insulated wires and an indium-based solder. An obscuring layer 9 which may be an opaque layer of backing paint, which may be a conventional mirror backing paint, applied over the heating layer 7 on the back surface of the glass 1.

Figure 2:
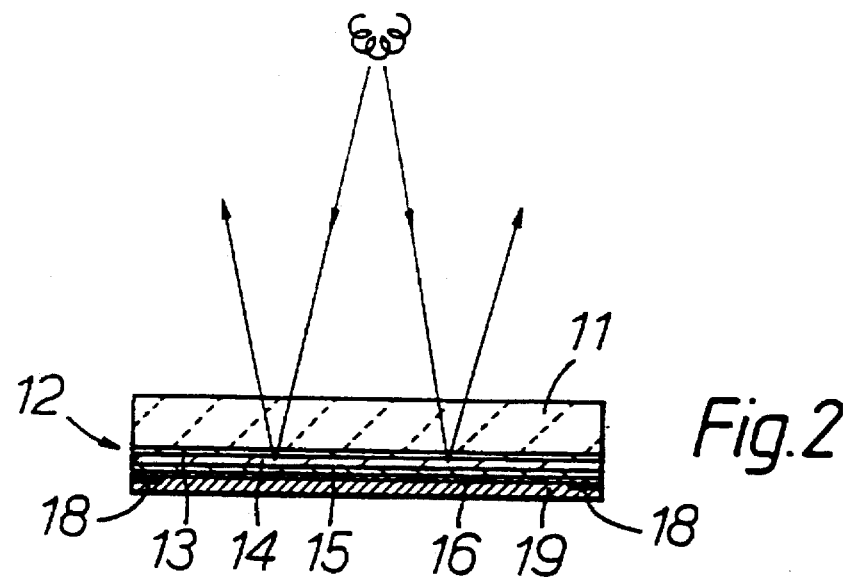
FIG. 2 is a section (not to scale) through a mirror in accordance with a second embodiment of the invention in use as a back surface mirror.

Referring to FIG. 2, a back surface glass mirror comprises a float glass substrate 11 carrying a coating 12 comprising an inner layer 13 of relatively high refractive index, for example of pyrolytic silicon, silicon oxide, tin oxide or titanium oxide, an intermediate layer 14 of relatively low refractive index, for example of silicon oxide having a refractive index below 1.8 and containing silicon and oxygen in atomic proportions of about 1:2, and an outer layer 15 of relatively high refractive index. The outer layer 15 preferably comprises a layer of silicon. As in FIG. 1 busbars 18 are deposited onto the heating layer 16. Each of the inner layer 13 and intermediate layer 14 has an optical thickness of n λ/4, wherein n is an odd integer (preferaly 1) and λ is a wavelength of light in the visible region of the spectrum i.e. from about 400 nm to 750 nm. If the inner and outer layers 13 and 15 are of an absorbing material such as silicon, the thickness of the outer layer is less critical, but it may also correspond to an optical thickness of n λ/4 wherein n and λ are defined above and n is preferably 1.

The use of titanium oxide as one of the inner or outer layers instead of silicon has been found to increase the reflectivity of the mirror products. For example, for back surface mirrors, the use of titanium dioxide as the inner layer can increase the reflectivity, as compared to such mirrors having a silicon inner layer, by about 3 to 7%.

An opaque layer 19 of backing paint, which may be a conventional mirror backing paint applied over the heating layer 16 on glass substrate 11 as an obscuring layer.

Figure 3:
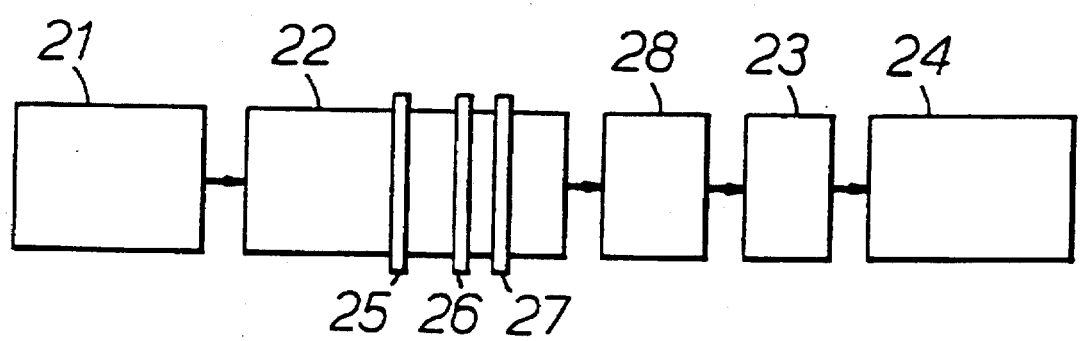
FIG. 3 is a diagrammatic representation of the arrangement of coating stations on a float glass production line for production of heatable mirrors in accordance with an embodiment of the method of the present invention.

FIG. 3 illustrates diagrammatically, a float glass production line comprising a glass melting section 21, a float bath section 22 for forming the molten glass into a continuous ribbon, a lehr section 23 for annealing the said glass ribbon and a warehouse section 24 for cutting pieces of glass from the ribbon for storage and/or distribution and use. For the production of mirrors in accordance with the method of the invention, each of the three coating stations for respectively applying the inner, intermediate and outer layers will normally be located in or between the float bath section 22 and lehr section 23; in the illustrated embodiment of the invention, the said three coating stations 25,26,27 are arranged in the float bath section 22 as shown in FIG. 3. In the illustrated embodiment, a heating layer deposition section 28 is located between the float glass section 22 at which the reflecting coating is applied to the glass substrate and the lehr section 23. The heating layer deposition section 28 may have the same structure as the coating apparatus disclosed in GB 2225343. This section is provided with reactants as described above in order to enable a heating layer, such a fluorine-doped tin oxide, to be deposited onto the reflecting coating. The float glass production line of FIG. 3 is specifically arranged to produce a back surface mirror having a reflecting coating on the back surface of the glass and a heating layer on the back surface of the reflecting coating. In alternative embodiments, one or each of the coating stations for applying inner, intermediate and outer layers in accordance with the invention may be located between the float bath section 22 and the lehr section 23. The location of each coating station is selected to be at a position where the glass ribbon has substantially reached its final thickness (usually at a glass temperature of around 750° C.) so that it is not subject to further stretching which might crack any coating applied, but where its temperature remains sufficiently high for formation of a further pyrolytic layer (usually a glass temperature of at least 300° C.).

The heating layer applying station 28 is required to be downstream in the direction of glass flow from the coating stations for applying the inner, intermediate and outer layers to the reflecting coating. The heating layer is preferably deposited at a position where the glass temperature is around 600° C.

The following Example illustrates the present invention without limiting it, and in the Example mirrors were produced on-line using a float glass production line having the structure shown in FIG. 3 (but without the heating layer deposition section 28) and a heatable layer was subsequently applied over the reflecting coating of the mirrors in an off-line deposition furnace.

EXAMPLE 1

Glass mirrors, intended for use as back surface heatable mirrors, were produced using the laminar vapour coating process and apparatus described in GB 1507996 incorporating the modification described in GB 2209176A. Three separate coating beams, each as described in said patent specifications, were used to apply successive silicon, silicon oxide and silicon layers to a ribbon of float glass. Each of the three coating beams was located in the float bath where the glass ribbon was supported on a bath of molten metal. The upstream beam was fed with 0.4 liters per minute of monosilane and 36 liters per minute of nitrogen, both being measured as a gas. The intermediate beam was fed with 1.9 liters per minute of monosilane, 0.4 liters per minute of ethylene and 14.5 liters per minute of nitrogen, each being measured as a gas, and 0.0045 liters per minute of acetone, being measured as a liquid. The downstream beam was fed with 0.8 liters per minute of monosilane, 0.2 liters per minute of ethylene and 30 liters per minute of nitrogen, each being measured as a gas. The glass speed was 180 metres per hour and the glass thickness was 2 mm. The glass side reflection of the coating was measured as being 70 to 72% using Illuminant D65 Source 1931 Observer conditions.

In Example 1 the gas flows were all measured at ambient temperature and pressure 0.7 bar, except for flows of nitrogen which were measured at ambient temperature and 1 bar pressure, and acetone which is measured as a liquid, and all are quoted per metre width of glass coated.

No modification of the lehr conditions was required to anneal the resulting coated ribbon which had a highly reflecting appearance.

A mirror cut from the glass ribbon having dimensions of 160 mm×160 mm was edge worked and cleaned and then supported, with the reflecting coating being upwardly oriented, on a 2000×1000 mm piece of 6 mm float glass. The glass assembly was then lowered onto a conveyor system of a fluorine-doped tin oxide application plant having a coating apparatus similar to that disclosed in GB 2225343. The glasses were conveyed into the furnace of the plant and were held in the furnace for a time period which was sufficient to raise the glass temperature to approximately 600° C. The furnace was then fed from an upstream slot with 250 ml/min of tin tetrachloride in 25 m$^3$/hr of air as a carrier gas at a temperature of 250° C. At a downstream slot a mixture of HF and methanol, and steam, all being in air as a carrier gas, were introduced into the flow of tin tetrachloride. The HF/methanol mixture comprised 4.76% by volume of methanol together with 95.24% by volume of a 20% solution of hydrofluoric acid. The steam was supplied at a rate of 11 kg/hr and the carrier gas was applied at a rate of 120 m$^3$/hr with the temperature being 450° C. The exhaust gases were extracted at a pressure of 0.3 inch of water gauge pressure.

A coating of fluorine-doped tin oxide around 3200 Angstroms thick was deposited on top of the reflecting coating. The sheet resistance of the coated glass was measured at 14 ohms/square by using a 4 point probe. The reflection of the reflecting coating on the glass side was measured at 70% using the same conditions specified above. Subsequently, silver busbars 5 mm wide were silk screened along two opposed lengths of the coated surface, the busbars being 137 mm apart. The printed assembly was pre-dried in an oven for 1 hour at 100° C. followed by firing at approximately 500° C. in the coating furnace to consolidate the printed busbars. Electrical connections were then made to the busbars by using insulated wires and indium as the solder.

The resistance across the busbars was then measured using a multimeter as 13.7 ohms. A voltage of 6 to 12 volts was applied across the busbars with a current of from 0.47 to 0.9 amps. This established sufficient heating to produce a demisting surface.

The process and product of the preferred embodiments of the present invention have important advantages over the prior art. The process enables heatable glass mirrors to be produced "on line" in a single manufacturing process starting with the batch which is melted to produce the molten glass, which is formed into a continuous ribbon, coated with reflecting and heating layers, annealed and cut to size for subsequent storage and for distribution. This is quite unlike the prior art processes used commercially for the production of heatable mirrors. which involve the initial production of glass panes cut from a ribbon, followed by a separate coating process (commonly carried out at a different location) on a separate production line, and then followed by assembly with a separate heating element which is in contact with an electrically insulating film disposed between the heating element and the silver reflecting layer of the mirror.

The present invention can provide the advantage that because the reflecting layer is insulating this obviates the requirement for an additional insulating layer between the heating layer and the reflecting layer as is required for the known silvered mirrors incorporating heating assemblies.

What is claimed is:

1. A method of producing heatable mirrors comprising depositing onto a ribbon of hot glass during the production process a non-metallic reflecting coating comprising a reflecting layer and at least two reflection enhancing layers, the reflection enhancing layers comprising an intermediate layer of the coating of relatively low refractive index and a layer adjacent to the intermediate layer of relatively high refractive index, the two layers other than the intermediate layer being outer and inner layers of the coating each having a refractive index of at least 1.6, the intermediate layer having a refractive index less than the refractive index of either said inner layer or said outer layer and less than 3, at least one of said inner and outer layers being of silicon, the aggregate refractive index of the inner and outer layers being at least 5.5, whereby the mirrors so formed have a visible light reflection in the range of 70% to 90%, and depositing an electroconductive heating layer onto the mirrors.

2. A method according to claim 1 wherein the heating layer is deposited over the reflecting coating on the ribbon of hot glass during the production process.

3. A method according to claim 2 wherein the reflecting coating is deposited onto the glass in the float bath of a float glass plant and the heating layer is deposited onto the mirrors in a gap between the float bath and an annealing lehr.

4. A method according to claim 2 wherein the mirrors are back surface mirrors and the heating layer comprises the rear surface thereof.

5. A method according to claim 1 wherein the heating layer is deposited on a glass surface which is on the opposing side of the glass to the reflecting coating.

6. A method according to claim 5 wherein the heating layer is deposited off-line onto mirrors which have been cut from the coated ribbon.

7. A method according to claim 5 wherein the mirrors are front surface mirrors and the heating layer comprises the rear surface thereof.

8. A method according to claim 1 wherein the reflecting layer comprises a layer adjacent to the intermediate layer of relatively high refractive index.

9. A method according to claim 8 wherein at least one of the relatively high refractive index layers is of silicon.

10. A method according to claim 9 wherein both of the relatively high refractive index layers are of silicon.

11. A method according to claim 9 wherein the outer of the said layers of relatively high refractive index is of tin oxide, titanium oxide or a silicon oxide.

12. A method according to claim 1 wherein the layer of relatively low refractive index comprises a layer of silicon oxide.

* * * * *